US011357252B2

(12) United States Patent
DeCastro et al.

(10) Patent No.: US 11,357,252 B2
(45) Date of Patent: Jun. 14, 2022

(54) SYNTHETIC MILK COMPOSITIONS FOR OPTIMAL GROWTH AND DEVELOPMENT AND PREVENTION OF OBESITY IN MALE AND FEMALE INFANT AND CHILDREN

(71) Applicant: Société des Produits Nestlé S.A., Vevey (CH)

(72) Inventors: Carlos Antonio DeCastro, Geneva (CH); Frederic Destaillats, Servion (CH); Francesca Giuffrida, Mezieres (CH); Sagar Thakkar, St-Legier (CH); Rajat Mukherjee, Montreux (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/514,301

(22) Filed: Jul. 17, 2019

(65) Prior Publication Data

US 2019/0335797 A1   Nov. 7, 2019

Related U.S. Application Data

(62) Division of application No. 15/104,027, filed as application No. PCT/EP2014/068487 on Sep. 1, 2014, now abandoned.

(30) Foreign Application Priority Data

Dec. 12, 2013   (EP) .................................... 13196795

(51) Int. Cl.
*A23L 33/00*   (2016.01)
*A23L 33/12*   (2016.01)
(52) U.S. Cl.
CPC .............. *A23L 33/40* (2016.08); *A23L 33/12* (2016.08); *A23L 33/30* (2016.08); *A23V 2002/00* (2013.01); *A23V 2200/332* (2013.01)
(58) Field of Classification Search
None
See application file for complete search history.

(56) References Cited

U.S. PATENT DOCUMENTS

| 4,221,291 A | 9/1980 | Hunt |
| 4,524,078 A | 6/1985 | Bardsley et al. |
| 5,290,574 A | 3/1994 | Jamieson et al. |
| 5,709,888 A | 1/1998 | Gil et al. |
| 2008/0003329 A1 | 1/2008 | Rueda et al. |
| 2011/0195144 A1* | 8/2011 | Haschke ................. A23L 33/19 426/2 |
| 2011/0294757 A1 | 12/2011 | Shulman et al. |
| 2012/0121757 A1 | 5/2012 | Zwijsen et al. |
| 2013/0177667 A1 | 6/2013 | Mace et al. |
| 2013/0280239 A1* | 10/2013 | Klassen ................. A23L 33/30 424/130.1 |

FOREIGN PATENT DOCUMENTS

| CN | 101484025 A | 7/2009 |
| CN | 103404595 A | 11/2013 |
| EP | 1062873 | 12/2000 |
| WO | 9531110 A1 | 11/1995 |
| WO | 0178530 | 10/2001 |
| WO | 2006057551 | 6/2006 |
| WO | 2007004878 | 1/2007 |
| WO | 2009068549 | 6/2009 |
| WO | 2010027258 | 3/2010 |
| WO | 2010081604 | 7/2010 |

OTHER PUBLICATIONS

Yang et al., "Handbook of Dietetic Therapy and Taboos for Pediatric Diseases", Yangcheng Press, 1st Edition, 2002, p. 11.
Office Action received for Chinese Patent Application No. 201480066668.4, dated Sep. 30, 2019, 12 pages.
Koletzko et al., "Global Standard for the Composition of Infant Formula: Recommendations of an ESPGHAN Coordinated International Expert Group", Journal of Pediatric Gastroenterology and Nutrition, vol. 41, Nov. 2005, pp. 584-599.
"Standard for Infant Formula and Formulas for Special Medical Purposes Intended for Infants", Codex Alimentarius, Codex Stan 72-1981.
Riva et al., "Closer to the Gold Standard: an Appraisal of Formulae Available in Italy for Use in Formula-fed Infants", the Journal of International Medical Research, vol. 33, 2005, pp. 595-611.
Butte et al., "Energy requirements of infants", Public Health Nutrition, vol. 8(7A), pp. 953-967.
Thakkar et al., "Dynamics of Human Milk Nutrient Composition of Women from Singapore with a Special Focus on Lipids", American Journal of Human Biolog, vol. 25, 2013, 11 pages.
Koletzko et al., "Global Standard for the Composition of Infant Formula: Recommendations of an ESPGHAN Coordinated International Expert Group", Journal of Pediatric Gastroenterology and Nutrition, vol. 41, pp. 584-599.

(Continued)

*Primary Examiner* — Lien T Tran
(74) *Attorney, Agent, or Firm* — K&L Gates LLP (57) ABSTRACT

Synthetic nutritional compositions for infants and young children up to the age of thirty-six months, particularly infant formulae and growing-up milks, vary according to gender and the age of the infant or young child. The compositions have been designed to ensure balanced growth and to prevent obesity in in-fancy and later in life.

15 Claims, 4 Drawing Sheets

(56) References Cited

OTHER PUBLICATIONS

Commission Directive 2006/141/ec on Infant Formulae and Follow-on Formulae and Amending Directive 1999/21/ec, Official Journal of the European Union, Dec. 22, 2006, 33 pages.

A. Prentice, "Constituents of human milk," Food and Nutrition Bulletin, vol. 17, No. 4 (1996), pp. 305-315.

O. Genzel-Boroviczényy, et al., "Fatty acid composition of human milk during the 1st month after term and preterm delivery." European Journal of Pediatrics 156.2 (1997), pp. 142-147.

Z. Karatas, et al. "Breastmilk ghrelin, leptin, and fat levels changing foremilk to hindmilk: is that important for self-control of feeding?," European Journal of Pediatrics 170.10 (2011), pp. 1273-1280.

Office Action issued in corresponding European Patent Application No. 14758383.5 dated May 22, 2017.

Powe, et al. "Infant Sex Predicts Breast Milk Energy Content," American Journal of Human Biology, vol. 22 (2010); pp. 50-54.

* cited by examiner

SYNTHETIC MILK COMPOSITIONS FOR OPTIMAL GROWTH AND DEVELOPMENT AND PREVENTION OF OBESITY IN MALE AND FEMALE INFANT AND CHILDREN

PRIORITY CLAIMS

This application is a divisional of U.S. application Ser. No. 15/104,027 filed Jun. 13, 2016 Now Abandon, which is a National Stage of International Application No. PCT/EP14/68487 filed Sep. 1, 2014, which claims priority to European Patent Application No. 13196795.2 filed Dec. 12, 2013, the entire contents of which are incorporated herein by reference.

FIELD OF THE INVENTION

The invention concerns synthetic nutritional compositions for infants and young children up to the age of thirty-six months, particularly infant formulae and growing-up milks. The compositions vary according to sex of the infant or young child.

BACKGROUND

Usually also, the infant formulae and/or follow-up formulae dosage and caloric density do not take into consideration the complementary food eaten by infants and young children when overfeeding the infants and young children. Also the starter formulas that target all children of 0-6 months do not distinguish the nutritional needs of infants aged 0-3 months from those aged 3 to 6 months old. It is known that breast milk composition changes considerably from the first to second and third month of lactation for example.

Furthermore, the dosage and caloric density of infant formulae and/or follow-up formulae do not take into consideration the sex of the child. Powe and associates [Powe C. E. et al. (2010); Infant sex predicts breast milk energy content, American journal of human biology, 22:50-54] have recently reported differences in energy content based on the gender of the new born infant. Milk secreted from the mothers of male infant was reported to be 25% greater in energy content when compared with the milk of mothers of female infants. This recent data is not surprising given that girls and boys have different physiological needs based upon the World Health Organization standard growth curves for boys and girls. Thus, the tendency to overfeed infants and young children is even more accentuated for girls, because the composition of current infant formulae and/or follow-up formulae of known infant formulae is the same for boys and girls.

It is known that a rapid growth of infants and young children increases a risk of obesity in later childhood or adulthood [Baird et al. (2005) Being big or growing fast: systematic review of size and growth in infancy and later obesity. B.M.J. 331(7522):929]. In the light of the data from Powe et al., one could postulate the risk of developing obesity is higher for girls. Infant formulas need to reduce the risk of obesity in later childhood or adulthood.

A number of studies indicate that nutrition in early postnatal life has an impact on long-term appetite regulation. For example, overfeeding rat pups results in altered appetite control with development of hyperphagia in adulthood of the rats [Davidowa, H., and Plagemann, A. (2004)]. Hypothalamic neurons of postnatally overfed, overweight rats respond differentially to corticotropin-releasing hormones [Neurosci Lett. November 16; 371(1):64-8)].

There is a need to provide a more balanced diet to infants and young children. This diet should take into account the gender of the infant or young child. It should also take into account the age of the child, specifically in months, for example 0-3, 3-6, 6-12 months etc. The diet should promote health benefits in the long term to the infants and young children.

There is a need to provide a nutritional system that enables the convenient, safe and accurate delivery of the most adequate nutrition all along the first months or years of the life of a baby.

There is need to provide a way to ensure that the best adequate individual nutritional solutions are made available to infants and their care-givers, in order to promote health benefits that may not be immediately visible but which consequences occur later in life.

There is a need to provide such cited nutritional compositions, especially during the first three years of life, that can help ensuring optimal growth and reduction of risk of health conditions later in life, such as cardiovascular diseases, diabetes, obesity, metabolic syndrome, or depressed immunity.

There is, thus, a need to provide a nutritional composition that acknowledges the gender and the specific age of the baby, while ensuring optimal growth and reduction of risk of health conditions later in life, such as cardiovascular diseases, diabetes, obesity, metabolic syndrome, or depressed immunity.

There is a need for an early-in-life nutritional intervention or control in order to deliver health benefits later-in-life.

To address these needs, the inventors have analyzed the milk from mothers to boys and from mothers to girls, at 30, 60 and 120 days post-partum in a longitudinal clinical study. Based on their results, they have designed synthetic nutritional formulas that have distinct amounts of certain nutrients for boys and for girls. The compositions of the present invention have been designed to ensure balanced growth and to prevent obesity in infancy and later in life.

SUMMARY

The present invention concerns synthetic nutritional formulations for infants and young children, meaning in the context of the invention, up to the age of 36 months. The compositions are especially adapted to the gender and the age of the child. The invention further relates to administration of these compositions for promoting balanced growth and preventing obesity.

The first aspect of the invention concerns a synthetic nutritional composition especially adapted to the nutritional needs of a male infant or child. The composition comprises:
 a. 60-85 kcal/100 ml energy,
 b. 3.9-6 g/100 ml lipid, and
 c. 600-810 mg/100 ml linoleic acid.

In a preferred embodiment, the composition may also comprise:
 d. Total polyunsaturated acids 710-930 mg/100 ml.

In another preferred embodiment, the composition may also comprise one or a mixture of phopholipids e.-g.:
 e. 4.7-6.8 mg/100 ml of phosphatidylcholine,
 f. 6.3-10 mg/100 ml of phosphatidylethanolamine, and
 g. 1-2 mg/100 ml of phosphatidylinositol.

In another preferred embodiment, the composition additionally comprises:
 h. 21-30 mg/100 ml of phospholipids.

In another preferred embodiment, the composition is especially adapted to the nutritional needs of a male infant less than 3 months old. This composition comprises:
a. 60-75 kcal/100 ml energy,
b. 3.9-4.9 g/100 ml lipid, and
c. 600-740 mg/100 ml linoleic acid,
and further comprises any one or a mixture of:
Total polyunsaturated acids 710-880 mg/100 ml,
d. 5.4-6.8 mg/100 ml of phosphatidylcholine,
e. 6.3-10 mg/100 ml of phosphatidylethanolamine,
f. 1-1.3 mg/100 ml of phosphatidylinositol, and
g. h. 21-26 mg/100 ml of phospholipids.

In another preferred embodiment, the composition is especially adapted to the nutritional needs a male infant or child older than 3 months old and younger than 36 months. This composition comprises:
a. 70-85 kcal/100 ml energy,
b. 5.0-6 g/100 ml lipid, and
c. 660-810 mg/100 ml linoleic acid,
and further comprises any one or a mixture of:
Total polyunsaturated acids 755-930 mg/100 ml,
d. 4.77-5.8 mg/100 ml of phosphatidylcholine,
e. 6.3-10 mg/100 ml of phosphatidylethanolamine,
f. 1.6-1.98 mg/100 ml of phosphatidylinositol, and
g. 24-30 mg/100 ml of phospholipids.

In a second aspect of the invention, there is provided a synthetic nutritional composition especially adapted to the nutritional needs of a female infant or young child comprising:
a. 57-70 kcal/100 ml energy,
b. 3.5-4.5 g/100 ml lipid, and
c. 410-580 mg/100 ml linoleic acid.

In a preferred embodiment of this second aspect of the invention, the synthetic nutritional composition also comprises:
d. Polyunsaturated acids 510-680 mg/100 ml.

In another preferred embodiment of this second aspect of the invention, the synthetic nutritional composition also comprises any one or a mixture of phospholipids e.-g.:
e. 5.2-6.4 mg/100 ml of phosphatidylcholine,
f. 5.8-8 mg/100 ml of phosphatidylethanolamine, and
g. 0.9-1.7 mg/100 ml of phosphatidylinositol.

In another preferred embodiment of the second aspect of the invention, the synthetic nutritional composition also comprises:
h. 19-25 mg/100 ml of phospholipids.

In another preferred embodiment, the composition is especially adapted to the nutritional needs of a female infant younger than 3 months old. This composition comprises:
a. 56-71 kcal/100 ml energy,
b. 3.6-4.4 g/100 ml lipid, and
c. 415-510 mg/100 ml linoleic acid,
and further comprises any one or a mixture of:
d. Total polyunsaturated acids 510-630 mg/100 ml,
e. 5.2-6.4 mg/100 ml of phosphatidylcholine,
f. 5.8-7.2 mg/100 ml of phosphatidylethanolamine,
g. 0.9-1.1 mg/100 ml of phosphatidylinositol, and
h. 20-24 mg/100 ml of phospholipids.

In another preferred embodiment, the composition for females is especially adapted to the nutritional needs of a female infant or child older than 3 months old and younger than 36 months. This composition is according to the second aspect of the invention, and comprises:
a. 56-71 kcal/100 ml energy,
b. 3.6-4.3 g/100 ml lipid, and
c. 475-580 mg/100 ml linoleic acid,
and further comprises any one or a mixture of:
d. Total polyunsaturated acids 550-670 mg/100 ml,
e. 5.2-6.4 mg/100 ml of phosphatidylcholine,
f. 6.4-7.9 mg/100 ml of phosphatidylethanolamine,
g. 1.35-1.65 mg/100 ml of phosphatidylinositol, and
h. 20-24 mg/100 ml of phospholipids.

In a third aspect of the invention, there is provided a set of two distinct synthetic nutritional compositions, wherein the first composition is especially adapted to the nutritional needs of a male infant or child, as described according to the first aspect of the invention. The second composition as described according to the first aspect of the invention is especially adapted to the nutritional needs of a female infant or child. The compositions of the invention are designed to ensure balanced growth and prevent obesity in male and female infants or young children during infancy, childhood and later in life.

The synthetic nutritional composition of the invention may be an infant formula in the form of a powder, liquid or concentrated liquid, or is a human milk fortifier.

BRIEF DESCRIPTION OF THE DRAWINGS

FIGS. 1A, 1B, 1C, 2, 3A, 3B, 3C and 3D show the results of the analysis of nutrients in the breast milk of 50 mothers in trial detailed in Example 1. Samples were taken at 30, 60 and 120 days post-partum. Quantities were measured in mg/100 ml. The measurements of milk of mothers to boys are shown with a dashed line, while the solid line shows the measurements of milk of mothers to girls. The P[gender] value relates to the differences in milk with respect to the sex of the baby. The P[age] values are differences in gender with respect to time; P[age] is a P value considering a linear model and P[age2] using a quadratic model. FIG. 1A shows energy density, FIG. 1B lipids, FIG. 1C linoleic acid, FIG. 2 total polyunsaturated fatty acids (PUFA)

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description.

In the present description, the following words are given a definition that should be taken into account when reading and interpreting the description, examples and claims.

Definitions

Infants: according to the Commission Directive 2006/141/EC of 22 Dec. 2006 on infant formulae and follow-on formulae, article 1.2 (a), the term "infants" means children under the age of 12 months.

Young Children (including young boys and young girls): according to the Commission Directives 2006/141/EC of 22 Dec. 2006 and/or 91/321/EEC of 14 May 1991 on infant formulae and follow-on formulae, article 1.2 (b), the term "young children" means children aged between one and three years.

Infant formulae: according to the Commission Directives 2006/141/EC of 22 Dec. 2006 and/or 91/321/EEC of 14 May 1991 on infant formulae and follow-on formulae, article 1.2 (c), the term "infant formulae" means foodstuffs intended for particular nutritional use by infants during the first four to six months of life and satisfying by themselves the nutritional requirements of this category of persons. It has to be understood that infants can be fed solely with infant formulas, or that the infant formula can be used by the carer as a complement of human milk. It is synonymous to the widely used expression "starter formula".

Follow-on formulae: according to the Commission Directives 2006/141/EC of 22 Dec. 2006 and/or 91/321/EEC of 14 May 1991 on infant formulae and follow-on formulae, article 1.2 (d), the term "follow-on formulae" means foodstuffs intended for particular nutritional use by infants aged over four months and constituting the principal liquid element in a progressively diversified diet of this category of persons.

Growing-up milk: milk-based nutritional composition especially adapted to a child of between one year and three years old.

Human Milk fortifier: Nutritional composition for infants or young children intended to be added to or diluted with human milk.

The term "hypoallergenic composition" means a composition which is unlikely to cause allergic reactions.

The term "sialylated oligosaccharide" means an oligosaccharide having a sialic acid residue.

The term "fucosylated oligosaccharide" means an oligosaccharide having a fucose residue.

The term "prebiotic" means non-digestible carbohydrates that beneficially affect the host by selectively stimulating the growth and/or the activity of healthy bacteria such as bifidobacteria in the colon of humans [Gibson G R, Roberfroid M B. *Dietary modulation of the human colonic microbiota: introducing the concept of probiotics*. J Nutr. 1995; 125:1401-12].

The term "probiotic" means microbial cell preparations or components of microbial cells with a beneficial effect on the health or well-being of the host [Salminen S, Ouwehand A. Benno Y. et al. "*Probiotics: how should they be defined*" Trends Food Sci. Technol. 1999:10 107-10].

An "allergy" is an allergy which has been detected by a medical doctor and which can be treated occasionally or in a more durable manner. A "food allergy" is an allergy with respect to a nutritional composition.

All percentages are by weight unless otherwise stated.

As used in this specification, the words "comprises", "comprising", and similar words, are not to be interpreted in an exclusive or exhaustive sense. In other words, they are intended to mean "including, but not limited to".

Any reference to prior art documents in this specification is not to be considered an admission that such prior art is widely known or forms part of the common general knowledge in the field.

The present inventors have carried out a major study on breast milk composition. This study involved both developing advanced analytical technologies to analyze milk samples and performing a longitudinal clinical trial with human milk sampling at 30, 60 and 120 days post-partum (see Example 1). The milk samples were quantitatively analyzed for macronutrients, fatty acids and phospholipids. The inventors have surprisingly found very significant differences, between milk of mothers of male infants compared to that of female infants, not only in energy (differences are greater than previously reported), but also in the quantities of lipids, total polyunsaturated acids (PUFAs) and phospholipids. The results of this trial indicated surprisingly significant differences in the levels of linoleic acid (LA), phosphatidylcholine, phosphatidylethanolamine, phosphatidylinositol, phosphatidylserine and total phospholipids for boys and girls (see Table 2 and FIGS. 1-3). In some cases, this difference between male and female destined milk varied over time (between 0-120 days).

Based upon the results of this study, the inventors have designed compositions that are especially adapted to meet the nutritional needs of male and female infant and young children. To the inventor's knowledge, to date, no gender specific formulations for infants or young children are known.

The Compositions According to the Invention:

The compositions of the invention are designed to meet the nutritional needs of male and female infants and young children. The compositions ensure balanced growth and prevent obesity in male and female infants or young children and later in life.

The synthetic nutritional compositions of the invention are designed for consumption by children from birth to three years old. They are specifically designed to be gender specific. In certain embodiments, they are also age specific, being designed for infants younger than three months old, or older than three months, but less than 36 months.

The synthetic nutritional compositions of the invention may be an infant formula in the form of a powder, liquid or concentrated liquid. The infant formula may be based on a cow's milk, goat's milk or buffalo milk. The infant formula may be a starter formula for infants that are less than 6 months old or a follow-on formula for infants that are more than 6 months old. The composition of the invention may be a growing up milk, or a human milk fortifier. In a preferred embodiment, the composition may be cow's milk whey based infant formula. The formula may also be a hypoallergenic (HA) formula in which the cow milk proteins are (partially or extensively) hydrolysed. The formula may also be based on soy milk or a non-allergenic formula, for example one based on free amino acids.

The nutritional compositions of the invention contain specific quantities of lipids, essential fatty acids, specifically linoleic acid (LA), and polyunsaturated fatty acids (PUFAs). The specific quantities of these nutrients are gender specific. Quantities of phospholipids including phosphatidylcholine, phosphatidylethanolamine, phosphatidylinositol and phosphatidylserine also vary for male and female destined compositions. The total number of phospholipids also varies. All of the latter components—essential fatty acids, sphingomyelin and phospholipids, are known to be important for balanced growth.

The quantities of all the nutrients expressed herein as mg/100 ml or g/100 ml reflect the amounts of nutrients present in the final liquid product, to be consumed by the infant or young child. For example, the composition may be a powdered infant formula that is diluted with water to give a final liquid product. The composition according to the invention may also be a concentrated liquid that is diluted with water to achieve the final liquid product. The composition of the invention may be a liquid product that is directly consumed by the infant or child as is. The composition according to the invention may be a human milk fortifier that is added to or diluted with human milk. In this case, the concentration of the nutrients already present in the human milk (to which the human milk fortifier is added) are to be taken as the average values for lactating mothers that are known or predicted from published clinical data.

The first aspect of the invention concerns a synthetic nutritional composition especially adapted to the nutritional needs of a male infant or child. The composition comprises:
    a. 60-85 kcal/100 ml, preferably 65-75 kcal/100 ml energy,
    b. 3.9-6 g/100 ml, preferably 4.5-5.5 g/100 ml lipid, and
    c. 600-810 mg/100 ml, preferably 650-750 mg/100 ml linoleic acid.

In a preferred embodiment, the composition may also comprise:
    d. 710-930 mg/100 ml, preferably 760-860 mg/100 ml polyunsaturated acids.

In another preferred embodiment, the composition may also comprise one or a mixture of phopholipids e.-g.:
    e. 5.4-6.8 mg/100 ml, preferably 5.6-6.4 mg/100 ml of phosphatidylcholine,
    f. 6.3-10 mg/100 ml, preferably 7-8 mg/100 ml of phosphatidylethanolamine, and
    g. 1-2 mg/100 ml, preferably 1.5 mg/100 ml of phosphatidylinositol.

In another preferred embodiment, the composition additionally comprises:
    h. 21-30 mg/100 ml, preferably 24-28 mg/100 ml of phospholipids.

In another preferred embodiment, the composition is especially adapted to the nutritional needs of a male infant less than 3 months old. This composition comprises:
    a. 60-75 kcal/100 ml, preferably 66-68 kcal/100 ml energy,
    b. 3.9-4.9 g/100 ml, preferably 4.3-4.5 g/100 ml lipid,
    c. 600-740 mg/100 ml, preferably 650-690 mg/100 ml linoleic acid,
    and further comprises any one or a mixture of:
    d. 710-880 mg/100 ml, preferably 780-820 mg/100 ml Total polyunsaturated acids,
    e. 5.4-6.8 mg/100 ml, preferably 5.9-6.3 mg/100 ml of phosphatidylcholine,
    f. 6.3-10 mg/100 ml, preferably 6.7-7.5 mg/100 ml of phosphatidylethanolamine,
    g. 1-1.3 mg/100 ml, preferably 1.2 mg/100 ml of phosphatidylinositol, and
    h. 21-26 mg/100 ml, preferably 23-25 mg/100 ml of phospholipids.

In another preferred embodiment, the composition is especially adapted to the nutritional needs a male infant or child older than 3 months old and younger than 36 months. This composition comprises:
    a. 70-85 kcal/100 ml, preferably 75-80 kcal/100 ml energy,
    b. 5.0-6 g/100 ml, preferably 5.3-5.5 g/100 ml lipid,
    c. 660-810 mg/100 ml, preferably 710-750 mg/100 ml linoleic acid,
    and further comprises any one or a mixture of:
    d. 755-930 mg/100 ml, preferably 820-860 mg/100 ml total polyunsaturated acids,
    e. 4.77-5.8 mg/100 ml, preferably 5.2-5.4 mg/100 ml of phosphatidylcholine,
    f. 6.3-10 mg/100 ml, preferably 8-9.5 mg/100 ml of phosphatidylethanolamine,
    g. 1.6-1.98 mg/100 ml, preferably 1.7-1.9 mg/100 ml of phosphatidylinositol, and
    h. 24-30 mg/100 ml, preferably 25-27 mg/100 ml of phospholipids,
    and wherein the composition is especially adapted to a male infant or young boy of more than three months old.

In a second aspect of the invention, there is provided a synthetic nutritional composition especially adapted to the nutritional needs of a female infant or young girl 15 comprising:
    a. 57-70 kcal/100 ml, preferably 60-65 kcal/100 ml energy,
    b. 3.5-4.5 g/100 ml, preferably 3.7-4.2 g/100 ml lipid, and
    c. 410-580 mg/100 ml, preferably 450-530 mg/100 ml linoleic acid.

In a preferred embodiment of this second aspect of the invention the synthetic nutritional composition also comprises:
    d. 510-680 mg/100 ml, preferably 550-630 mg/100 ml polyunsaturated acids.

In another preferred embodiment of this second aspect of the invention, the synthetic nutritional composition also comprises any one or a mixture of phospholipids e.g.:
    e. 5.2-6.4 mg/100 ml, preferably 5.4-6.2 mg/100 ml of phosphatidylcholine,
    f. 5.8-8 mg/100 ml, preferably 6.4-7.4 mg/100 ml of phosphatidylethanolamine, and
    g. 0.9-1.7 mg/100 ml, preferably 1.1-1.3 mg/100 ml of phosphatidylinositol.

In another preferred embodiment of the second aspect of the invention, the synthetic nutritional composition also comprises:
    h. 19-25 mg/100 ml, preferably 21-23 mg/100 ml of phospholipids.

In another preferred embodiment, the composition is especially adapted to the nutritional needs of a female infant younger than 3 months old. This composition comprises:
    a. 56-71 kcal/100 ml, preferably 62-66 kcal/100 ml energy,
    b. 3.6-4.4 g/100 ml, preferably 4 g/100 ml lipid, and
    c. 415-510 mg/100 ml, preferably 450-470 mg/100 ml linoleic acid,
    and further comprises any one or a mixture of:
    d. 510-630 mg/100 ml, preferably 560-580 mg/100 ml total polyunsaturated acids,
    e. 5.2-6.4 mg/100 ml, preferably 5.6-6.0 mg/100 ml of phosphatidylcholine,
    f. 5.8-7.2 mg/100 ml, preferably 6.1-6.7 mg/100 ml of phosphatidylethanolamine,
    g. 0.9-1.1 mg/100 ml, preferably 1 mg/100 ml of phosphatidylinositol, and
    h. 20-24 mg/100 ml, preferably 21-23 mg/100 ml of phospholipids.

In another preferred embodiment, the composition for females is especially adapted to the nutritional needs of a female infant or child older than 3 months old and younger than 36 months. This composition is according to the second aspect of the invention, and comprises:
    a. 56-71 kcal/100 ml, preferably 60-65 kcal/100 ml energy,
    b. 3.6-4.3 g/100 ml, preferably 3.8-4.1 g/100 ml lipid, and
    c. 475-580 mg/100 ml, preferably 510-530 mg/100 ml linoleic acid, and further comprises any one or a mixture of:
    d. 550-670 mg/100 ml, preferably 580-630 mg/100 ml total polyunsaturated acids,
    e. 5.2-6.4 mg/100 ml, preferably 5.6-6.1 mg/100 ml of phosphatidylcholine,
    f. 6.4-7.9 mg/100 ml, preferably 6.9-7.5 mg/100 ml of phosphatidylethanolamine,
    g. 1.35-1.65 mg/100 ml, preferably 1.4-1.6 mg/100 ml of phosphatidylinositol, and
    h. 20-24 mg/100 ml, preferably 21-23 mg/100 ml of phospholipids.

In a third aspect of the invention, there is provided a set of two distinct synthetic nutritional compositions. Each set comprises a first composition and second composition. The first composition is any of the compositions described above that are especially adapted to the nutritional needs of a male infant or child. The second composition is any of the compositions described above that is especially adapted to the nutritional needs of a female infant or child. The first and second compositions are conditioned separately. The first and second compositions in the set are commercialized under the same marketing concept umbrella.

The set of the invention can preferably be commercialized under the same marketing concept (for example gender segmentation and/or specific adaptation of nutritional compositions for male and female infants or children).

The first and second compositions are distinct in that they differ by at least 10% in the quantity of at least one of the common components in the two compositions chosen among a. to h.

The first and second compositions may be then conditioned separately, or group together in another outer container, or packaging. The packaging may be for example simply a layer or plastic film, a bag, box, piece of foil, or other means to keep the first and second compositions grouped together.

The set may comprise additional third, fourth and fifth etc. compositions that are especially adapted to meet the nutritional needs of infants or young children that are for example, 3-6 months old 6-9 months old or 9-12 months old. The set may also contain additional compositions that target in the same way children older than one year up to three years old.

Other ingredients in the compositions:

Other standard ingredients known to the skilled person for formulating an infant formula, human milk fortifier or growing-up milk may also be present in the compositions of the invention.

The nutritional compositions of the invention may contain other ingredients which may act to enforce the technical effect of the components a.-k.

Prebiotics:

The prebiotics that may be used in accordance with the present invention are not particularly limited and include all food substances that promote the growth of probiotics or health beneficial micro-organisms in the intestines. Preferably, they may be selected from the group consisting of oligosaccharides, optionally containing fructose, galactose, mannose; dietary fibers, in particular soluble fibers, soy fibers; inulin; or mixtures thereof. Preferred prebiotics are fructo-oligosaccharides (FOS), galacto-oligosaccharides (GOS), isomalto-oligosaccharides (IMO), xylo-oligosaccharides (XOS), arabino-xylo oligosaccharides (AXOS), mannan-oligosaccharides (MOS), oligosaccharides of soy, glycosylsucrose (GS), lactosucrose (LS), lactulose (LA), palatinose-oligosaccharides (PAO), malto-oligosaccharides, gums and/or hydrolysates thereof, pectins and/or hydrolysates thereof.

In particular, the human milk oligosaccharides, for example sialylated oligosaccharides, described in WO 2012/069416 published on May 31, 2012 may be included in the composition according to the invention. The latter oligosaccharides may act in synergy with the essential fatty acids and phospholipids of the invention to promote the healthy establishment of cognitive function in the young developing infant or young child.

Probiotic may be added to the composition. All probiotic micro-organisms may be added additionally. Preferably, the probiotic may be selected for this purpose from the group consisting of *Bifidobacterium, Lactobacillus, Lactococcus, Enterococcus, Streptococcus, Kluyveromyces, Saccharoymces, Candida*, in particular selected from the group consisting of *Bifidobacterium longum, Bifidobacterium lactis, Bifidobacterium animalis, Bifidobacterium breve, Bifidobacterium infantis, Bifidobacterium adolescentis, Lactobacillus acidophilus, Lactobacillus casei, Lactobacillus paracasei, Lactobacillus salivarius, Lactobacillus lactis, Lactobacillus rhamnosus, Lactobacillus johnsonii, Lactobacillus plantarum, Lactobacillus salivarius, Lactococcus lactis, Enterococcus faecium, Saccharomyces cerevisiae, Saccharomyces boulardii* or mixtures thereof, preferably selected from the group consisting of *Bifidobacterium longum* NCC3001 (ATCC BAA-999), *Bifidobacterium longum* NCC2705 (CNCM 1-2618), *Bifidobacterium longum* NCC490 (CNCM 1-2170), *Bifidobacterium lactis* NCC2818 (CNCM 1-3446), *Bifidobacterium breve* strain A, *Lactobacillus paracasei* NCC2461 (CNCM 1-2116), *Lactobacillus johnsonii* NCC533 (CNCM 1-1225), *Lactobacillus rhamnosus* GG (ATCC53103), *Lactobacillus rhamnosus* NCC4007 (CG MCC 1.3724), *Enterococcus faecium* SF 68 (NCC2768; NCIMB10415), and mixtures thereof.

In one embodiment the synthetic nutritional compositions of the invention comprise probiotics active or inactivated, dead or alive, preferably in sufficient dose to be effective (e.g. between $10^6$ to $10^{11}$ or between 10' and $10^9$ cfu/g of composition). In one embodiment the composition of the invention for male infant comprises a probiotic having a specific effect for male infant and is different from the probiotic comprised in the composition of the invention for female infant. In one embodiment such probiotics comprise *Bifidobacterium lactis* or *Lactobacillus rhamnosus* GG for male and B. *Longum* for female (or possibly vice-versa). In one embodiment such probiotics comprise *Bifidobacterium lactis* for male and *Lactobacillus rhamnosus* for female (or possibly vice-versa). The choice of probiotics is specifically adapted for the particular needs of male and female infants, in particular for the optimum growth and/or prevention of obesity later in life.

Vitamins, minerals and other micronutrients suitable for administration to children under the age of three may be added to the compositions of the invention.

The Compositions of the Invention Promote the Balanced Development and Prevent Obesity Later in Life:

The compositions according to the invention are especially adapted to promote the balanced growth and prevent obesity in infants and young children. The indicators of normative growth are defined by World Health Organization (WHO) [Acta Paediatrica, 2006; Suppl 450: 76-85]. These indicators are: length/height-for-age, weight-for-age weight-for-length, weight-for-height, body mass, index-for-age (BMI-for-age), head circumference-for-age, arm circumference-for-age, subscapular skinfold-for-age, triceps skinfold-for-age, motor development milestones, weight velocity, length velocity and head circumference velocity. Furthermore, each indicator is available independently for male and female gender of the infant. The value of any particular indicator of an infant between 3rd and 97th percentile at a corresponding time point is considered normal and/or optimal.

Lipids in human milk provide to the infant the calories needed for growth as well as essential fatty acids and phospholipids such as phosphatidylcholine, phosphatidyethanolamine, phosphatidylserine, phosphatidylinositol and sphingomyelin [Jensen R G., (1999), Lipids in Human Milk, Lipids 34, 1243-1271]. The essential fatty acids include alpha-linolenic acid (ALA), an omega-3 fatty acid, and linoleic acid (LA), an omega-6 fatty acid. ALA and LA cannot be synthesized by humans and thus must be obtained from the diet.

Phosphatidylcholine (PC) and choline are critically important nutrients for the normal development of the infant [Zeisel, S. H. (1998) Choline and Phosphatidylcholine are important components of an infant's diet, in Lipids in Infant Nutrition, AOCS Press, Champaign, Ill.]. Phosphatidylcholine is the prevalent phospholipid found in cell membranes and is an important methyl donor and is involved in cholesterol homeostasis. Metabolism of PC, sphingomyelin and phosphatidylethanolamine (PE) are related, and therefore, PE is an important nutrient to support infant growth and development. In addition, dietary phospholipids such as PC, PE and phosphatidylinositol are converted into lyphospholipids in the gastrointestinal tract by the action of the phospholipase A2 [Chanussot F., Lecithine, metabolism et nutrition, Lavoisier (2008)].

According to a preferred embodiment of the invention, the compositions according to the invention that are especially adapted to meet the nutritional needs of male infants and young children promote balanced growth in these male infants and young children and prevent obesity these children later in life. According to another preferred embodiment of the invention, the compositions according to the invention that are especially adapted to meet the nutritional needs of female infants and young children promote balanced growth in these female infants and young children and prevent obesity these children later in life.

Thus, in one embodiment of the invention, the synthetic nutritional composition of the invention is an infant formula (or a follow-on formula or a growing up milk or a human milk fortifier), for infant of less than 36 months, less than 24 months, less than 12 months, less than 6 months or preferably of 3 months or less. It is generally known, or at least hypothesized, that early nutritional interventions can be more effective (in comparison to intervention at later stages in life) in programming the metabolic pathways of the infants to induce optimal balanced growth and thus prevent obesity during infancy and later in life.

In one embodiment of the invention the synthetic nutritional composition of the invention is an infant formula intended and/or especially designed for preterm infants and/or caesarean-born infants. It is generally known, or at least hypothesized, that these subject groups are more prone to suffer from unbalanced growth (and, thus, from being obese later in life) due to the immaturity of their metabolic pathways and physiological conditions at birth. Early adaptation and control of the diet is therefore of the highest importance.

In one embodiment of the invention, the synthetic nutritional composition of the invention is an infant formula (or a follow-on formula or a growing up milk or a human milk fortifier), for infants born from mothers or parents having a history of obesity or overweight. It is generally known, or at least hypothesized, that these subjects groups are more prone to suffer from unbalanced growth (and, thus, from being obese later in life), due, for example, to genetic or epigenetic predispositions. It is, therefore, critical to address such issues as early as possible during infancy by a specifically adapted diet.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention is further described with reference to the following examples. It will be appreciated that the invention as claimed is not intended to be limited in any way by these examples.

EXAMPLES

Example 1

Longitudinal Clinical Trial:

The present inventors designed a longitudinal clinical trial with 50 lactating mothers with milk sampling at 30 (visit 1), 60 (visit 2) and 120 (visit 3) days post-partum. The milk samples were quantitatively analyzed for energy and total solids.

Human Milk Collection:

The protocol and collection of human milk was reviewed and approved by the local ethical committee of Singapore. The study took place at National University of Singapore. Volunteer mothers of term infants, who were apparently healthy and non-smokers (n=50; 31.1±3.1-year old) provided breast milk samples (approximately 30 mL; 4 weeks post-partum). Samples were collected after full expression from one breast using milk pump and while the baby was fed on the other breast. All efforts were made to collect complete feed that included fore-milk, mid-milk and hind-milk as a representation of one feed and to avoid within feed variation of lipid content. Approximately 30 mL aliquot was separated in a conical polypropylene tube for this study and the rest was fed to the infant. Samples collected for research were stored at −80° C. until analyses.

Macronutrient and Energy Density Analysis by Mid-Infrared (MIR) Assay:

The MIR analyses were performed with the Human Milk Analyzer (HMA, Miris, Sweden). The HMA is based on a semisolid MIR transmission spectroscopy, designed specifically for determination of the macronutrient composition of human milk. The use of the machine was according to manufacturer's instructions. Briefly 1 mL of previously warmed sample (up to 40° C. in water bath) was sonicated for 1 min before manual injection to the milk inlet. The analysis was conducted within next minute before the milk was retrieved and the inlet washed with de-ionized water. The cell was also washed with supplied detergent every 5 sample injections. Also every 10 samples an in-house control as well as calibrating standard provided by Miris were ran for quality control purposes.

Fatty Acid Analysis:

Fatty acid methyl esters (FAMES) were prepared using HCl/Methanol (3N) as a catalyst. The methylation procedure was as follows: In a 15 mL test tube equipped with Teflon-lined screw caps, 250 µL of human milk was added followed by 300 µL of internal standard FAME 11:0 and 300 µL of internal standard TAG 13:0, 2 mL of methanol, 2 mL of methanol/HCL (3N) and 1 mL of n-hexane. Test tubes were firmly capped, shaken vigorously and heated at 100° C. for 60 min, with occasional additional shaking. Care was taken to fit the cap tightly with cap liner to avoid leaks when tubes are heated at 100° C. After cooling down to room temperature, 2 mL water is added and shaken vigorously for centrifugation at 1200 g for 5 min followed by the transfer of the upper phase (hexane) into GC vials. For optimal GLC separation, the use of a long (100 m), highly polar capillary column is recommended. These columns allow accurate separation of FAME, including the cis and trans isomers. GLC analyses were performed according to standard conditions known to the skilled person. A 7890A gas-chromatograph with a 7693 autosampler with preparative station module (Agilent Technologies, Palo Alto, Calif.) equipped with a fused-silica CP-Sil 88 capillary column (100% cyanopropylpolysiloxane; 100 m, 0.25 mm id, 0.25 μm film thickness; Agilent, Palo Alto, Calif.) was used with a split injector (1:25 ratio) heated at 250° C. and a flame-ionization detector operated at 300° C. The oven temperature programming used was 60° C. isothermal for 5 min, increased to 165° C. at 15° C./min, isothermal for 1 min at this temperature, and then increased to 195° C. at 2° C./min and held isothermal for 14 min and then increased to 215° C. at 5° C./min and held isothermal for 8 min at 215° C. Hydrogen was used as carrier gas under constant flow mode at 1.5 mL/min.

Phospholipid Analysis:

Phospholipid families were separated by normal-phase high-performance liquid chromatography using 2 Nucleosil 50-5, 250×3 mm, 5μ (Macherey-Nagel, Easton, USA) equipped with pre-column Nucleosil 50-5, 8×3 mm, 5μ (Macherey-Nagel, Easton, USA). The chromatography system consisted of an Agilent 1200 module (Agilent Technologies, Basel, Switzerland) and an in-line PL-ELS 1000 evaporative light scattering detector (Polymer Laboratories, Shropshire England). All chromatography was performed at 55° C. Solvent A was composed of ammonium formiate 3 g/L and solvent B of acetonitrile/methanol (100/3 v/v). Gradient conditions for phospholipid analysis were as follows: time=0 min 1% solvent A; time=19 min 30% solvent A; time=21 min 30% solvent A; time=24 min 1% solvent A; flow rate was 1 mL/min. Data were collected and processed using Agilent Chem. Station software.

Ganglioside Analysis:

Gangliosides were separated by LC using an Aquity BEH C18 column (1.7 μm; 150×2.1 mm i.d.; Waters). The chromatography system consisted of Infinity1290 modules (Agilent Technologies, Basel, Switzerland) coupled to triple quadrupole mass spectrometer (Applied biosystems/MSD Sciex, 5500 Ontario, Canada). All chromatography was performed at 50° C. Solvent A composed of water/methanol/ammonium acetate (1 mM) (90/10/0.1 v/v/v) and solvent B of methanol/ammonium acetate (1 mM) (100/0.1 v/v). Gradient conditions were as follows: time=0 min 10% solvent A; time=0.2 min 10% solvent A; time=8.2 min 5% solvent A; time=12.2 min 5% solvent A; time=12.4 min 0% solvent A; time=18.4 min 0% solvent A; time=18.6 10% solvent A; time=21 10% solvent A. Flow rate was 0.2 mL/min. The mass spectrometer was equipped with electrospray ionization (ESI) ion source. The ESI mass spectra were recorded in the negative ion mode under the following conditions: ion spray voltage (IS) −4000 V, temperature of the source 250° C., declustering potential (DP) −40V. Disialogangliosides 3 (GD3) and monosialogangliosides 3 (GM3), were monitored by transitions of the precursor ions to the m/z 290 product ion listed in the Table 1. The ion m/z 290 corresponds to Neu5Ac fragments obtained from B type of cleavage according to (13). Data were collected and processed using Multiquant software 2.1 (Applied Biosystems, Sciex, Ontario, Canada). Quantification was performed by calibration curve. Stock solutions of GD3 and GM3 were prepared in methanol 70% (1 mg/mL) and further dilutions to volume with methanol 70% were performed to give 6 concentration levels covering a range from 7.5 to 22.5 μg/mL. Total area of GD3 and GM3 was calculated as the sums of peak areas of the transitions of the precursor ions to the m/z 290 product ion.

Figure 1A:
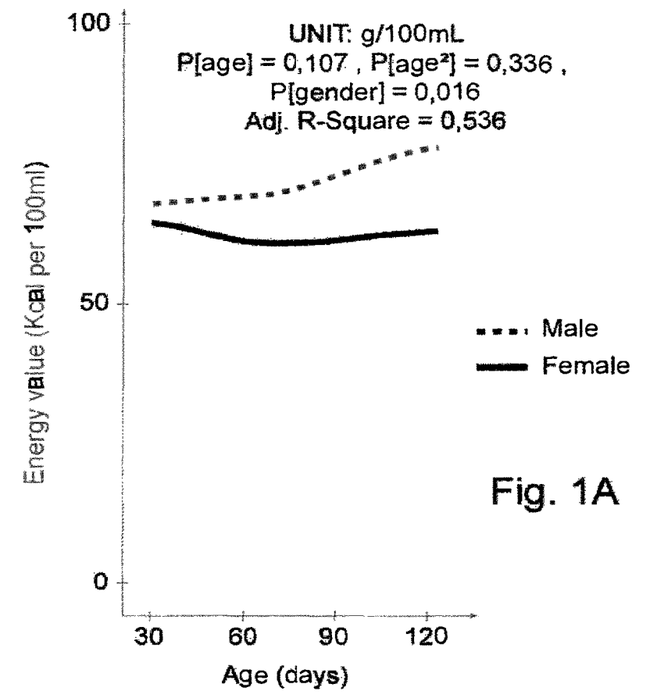
Figure 1B:
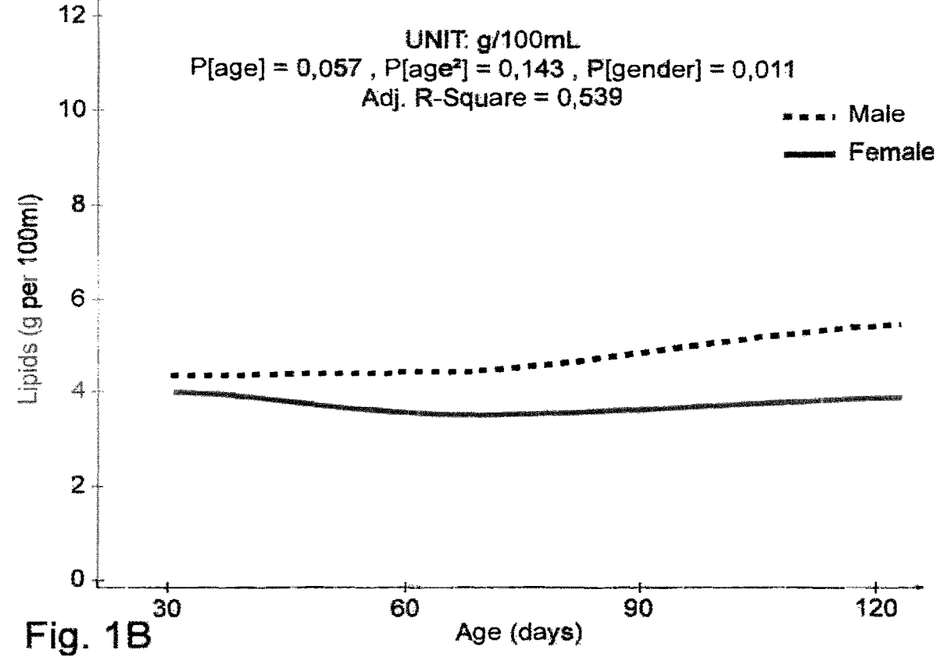
Figure 1C:
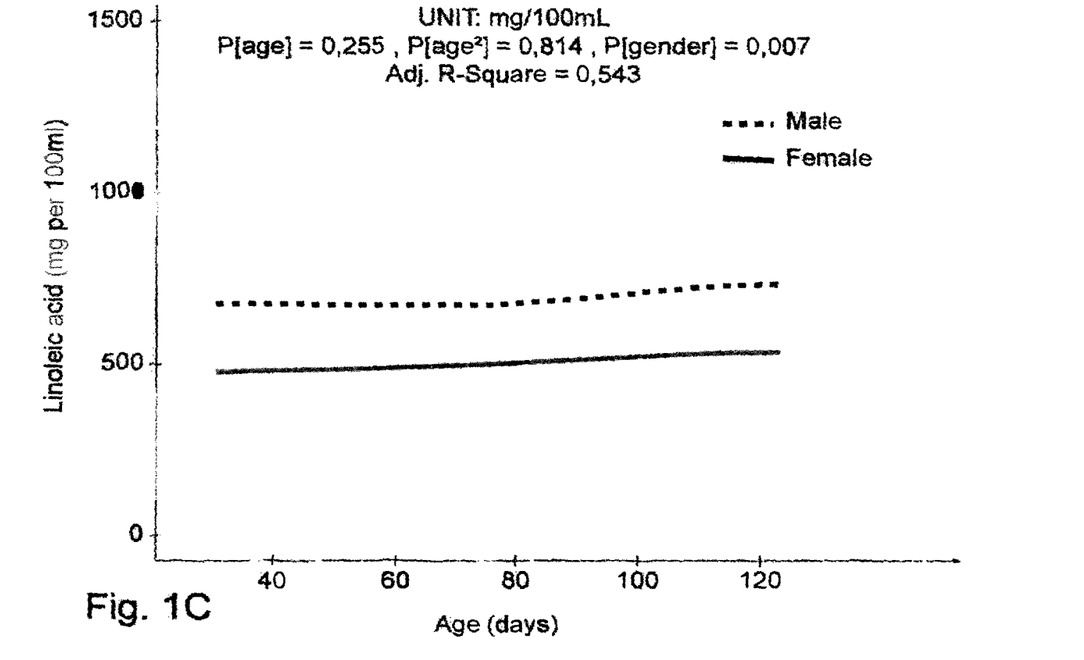
Figure 2:
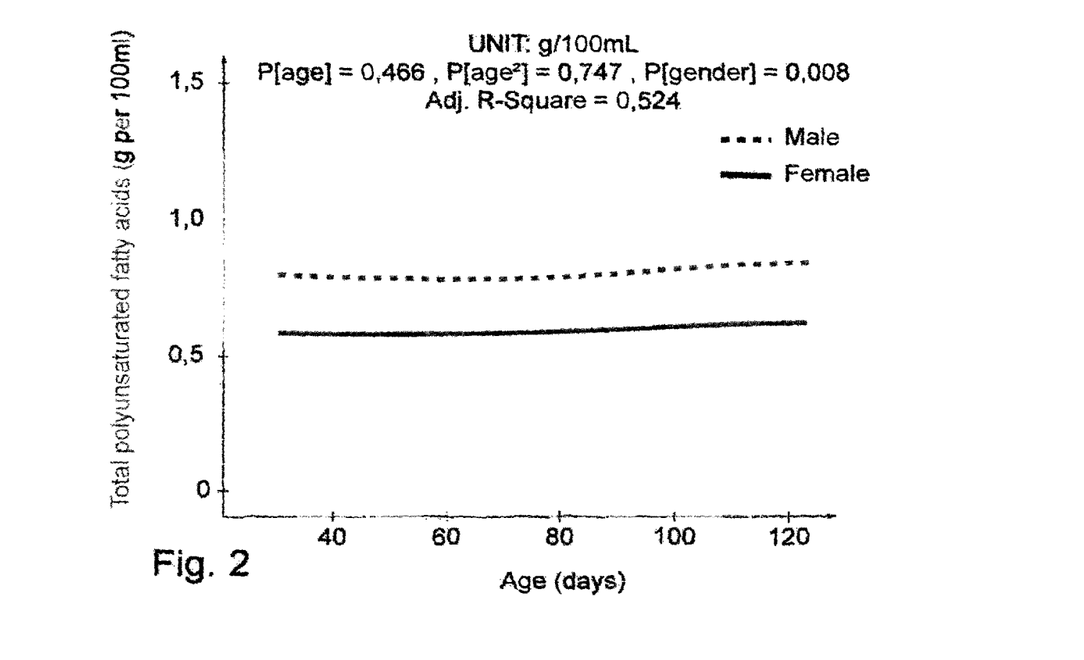
Figure 3A:
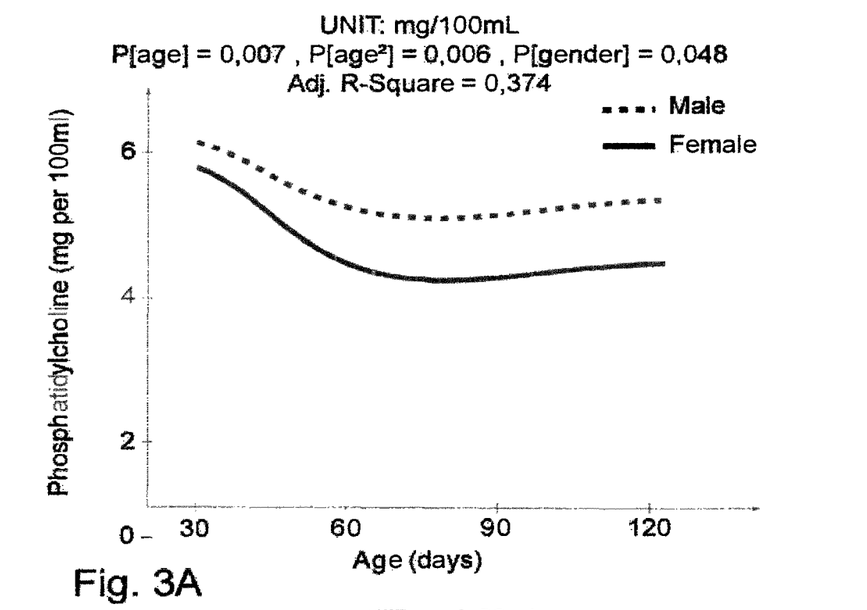
FIG. 3A shows phosphatidylcholine.
Figure 3B:
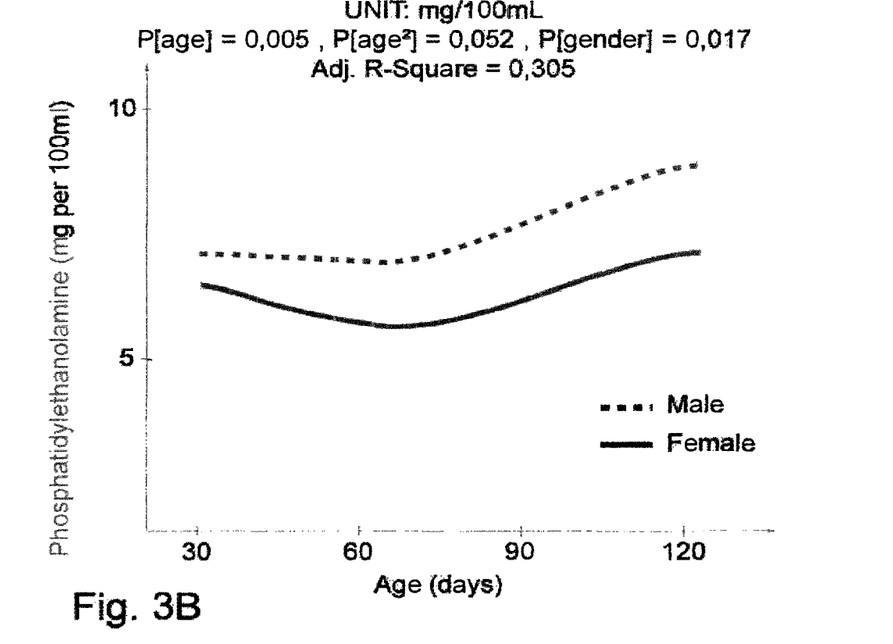
FIG. 3B shows phosphatidylethanolamine.
Figure 3C:
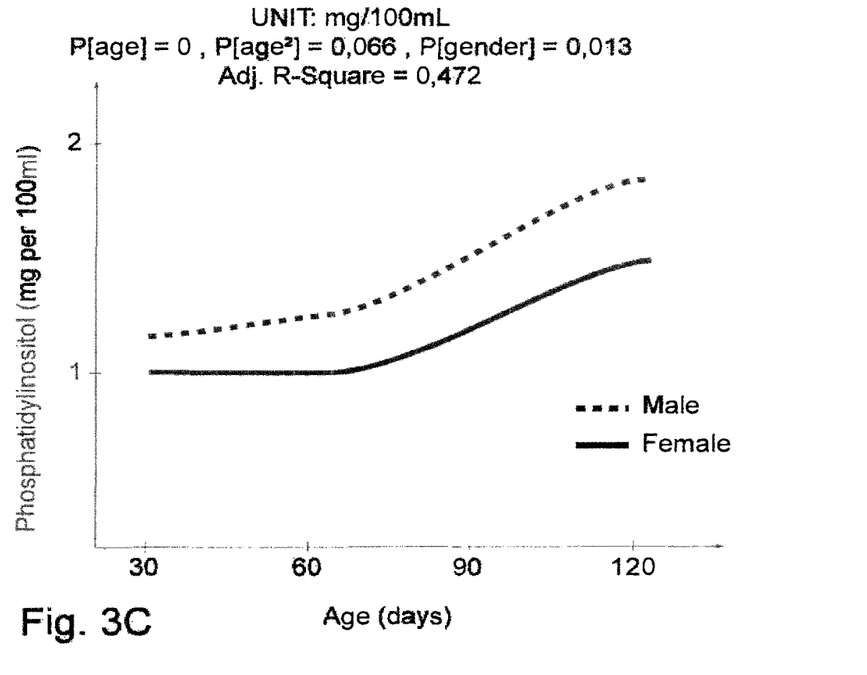
FIG. 3C shows phosphatidylinositol.
Figure 3D:
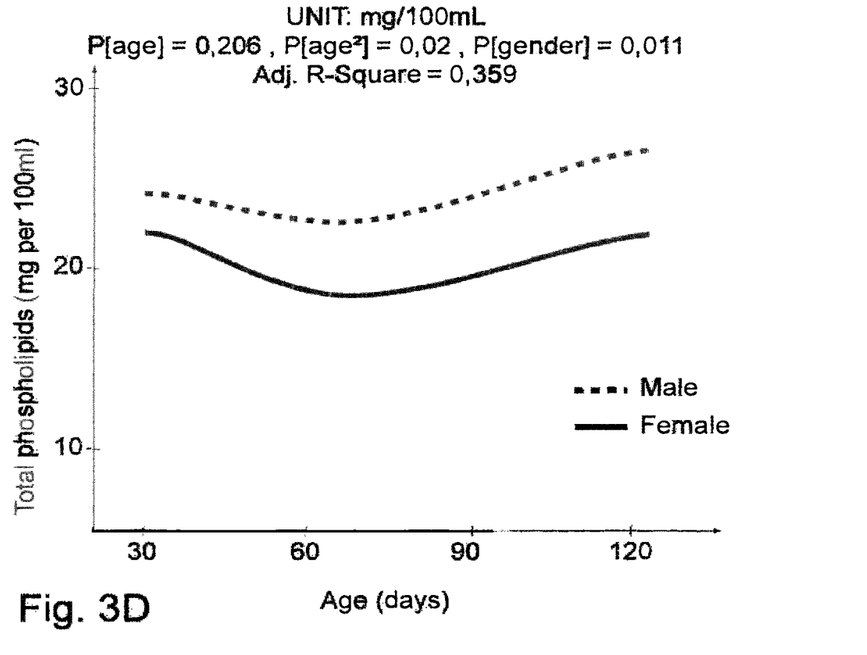
FIG. 3D shows total phospholipids.

Statistical Analysis:

Data collection points are 1, 2 and 4 months after infants' birth. Table 2 shows the Min, Mean, SD and Max for each unit of measurement Statistical models fitted to the raw data are shown in FIGS. 1-3. Longitudinal analysis was carried out using linear mixed models. The figures also show the sequential effect of each of the terms age, age2, gender and age-gender interactions in this particular order in terms of the P-value for the corresponding F-test. Thus, the P[age] is a P value considering a linear model and P[age2] corresponds to a quadratic one. The appropriate model is chosen according to whether the trajectory is linear (P[age]) or curved (P[age2]).

Adjusted R-squares were computed to obtain the degree of variability that is explained by the statistical models used.

Analysis was carried out using the following mixed-effects linear model:

Conc: =Age+Age2+Gender+Age_Gender+(Age2)
    _Gender+Random Effects:

Random effects are subject specific terms to model the underlying correlation between repeat measures.

TABLE 1

Precursor ions for GD3 and GM3. The collision energy (CE) was set at −40 V.

| Type of molecular ion | Predicted m/z | Observed m/z | Mass Error (ppm) | Assigned structure |
|---|---|---|---|---|
| [M − H]* | 1125.6897 | 1125.6902 | 8.7 | GM3d32:0 |
| [M − H]* | 1151.7053 | 1151.7059 | −5.1 | GM3d34:1 |
| [M − H]* | 1149.6897 | 1149.6002 | 8.5 | GM3d34:2 |
| [M − H]* | 1175.7053 | 1175.7059 | 5.0 | GM3d36:3 |
| [M − H]* | 1173.6869 | 1173.6902 | 8.3 | GM3d36:4 |
| [M − H]* | 1207.7679 | 1207.7685 | 1.3 | GM3d38:1 |
| [M − H]* | 1235.7992 | 1235.7998 | 0.2 | GM3d40:1 |
| [M − H]* | 1223.7992 | 1223.7998 | 0.2 | GM3d40:7 |
| [M − H]* | 1263.8305 | na | — | GM3d42:1 |
| [M − H]* | 1261.8149 | na | — | GM3d42:2 |
| [M − 2H]$^{2-}$ | 706.8808 | 706.8814 | −1.9 | GD3d32:1 |
| [M − 2H]$^{2-}$ | 721.9043 | 721.9048 | −6.7 | GD3d34:0 |
| [M − 2H]$^{2-}$ | 720.8965 | 720.8970 | 4.1 | GD3d34:1 |
| [M − 2H]$^{2-}$ | 719.8887 | 719.8892 | 0.2 | GD3d34:2 |
| [M − 2H]$^{2-}$ | 718.8808 | 718.8814 | −1.9 | GD3d34:3 |
| [M − 2H]$^{2-}$ | 728.9121 | 728.9127 | −3.7 | GD3d35:0 |
| [M − 2H]$^{2-}$ | 735.9195 | 735.9205 | 0.5 | GD3d36:0 |
| [M − 2H]$^{2-}$ | 733.9043 | 733.9048 | −6.6 | GD3d36:2 |
| [M − 2H]$^{2-}$ | 742.9278 | 742.9283 | 2.3 | GD3d37:0 |
| [M − 2H]$^{2-}$ | 741.9200 | 741.9205 | −0.7 | GD3d37:1 |
| [M − 2H]$^{2-}$ | 749.9356 | 749.8984 | 2.1 | GD3d38:0 |
| [M − 2H]$^{2-}$ | 747.9200 | 747.9205 | 0.7 | GD3d38:2 |
| [M − 2H]$^{2-}$ | 746.9121 | 746.9127 | −3.6 | GD3d38:3 |
| [M − 2H]$^{2-}$ | 745.9043 | 745.9048 | 6.5 | GD3d38:4 |
| [M − 2H]$^{2-}$ | 744.8965 | 744.8970 | −9.4 | GD3d38:5 |
| [M − 2H]$^{2-}$ | 743.8887 | 743.8892 | 1.1 | GD3d38:6 |
| [M − 2H]$^{2-}$ | 763.9513 | 763.9528 | −2.3 | GD3d40:0 |
| [M − 2H]$^{2-}$ | 762.9434 | 762.9440 | −5.2 | GD3d40:1 |
| [M − 2H]$^{2-}$ | 777.9669 | 777.9674 | 3.3 | GD3d42:0 |
| [M − 2H]$^{2-}$ | 775.9513 | 775.9048 | −6.2 | GD3d42:2 | nd: not detected na: identification by high mass resolution mass spectrometer was not possible because outside the capability m/z range of the instrument.

TABLE 2

Longitudinal evolution of energy value and various lipids in human milk secreted for baby girls (N = 25) and baby boys (N = 25)

| Nutrient | Visit | Milk secreted for baby girls | | | | Milk secreted for baby boys | | | | Combined | | | |
|---|---|---|---|---|---|---|---|---|---|---|---|---|---|
| | | Min | Mean | SD | max | Min | Mean | SD | max | Min | Mean | SD | max |
| Energy value (kcal Per 100 mL) | V1 | 41.00 | 64.04 | 8.12 | 75.00 | 49.00 | 67.80 | 10.41 | 88.00 | 41.00 | 65.92 | 9.43 | 88.00 |
| | V2 | 28.00 | 62.08 | 14.47 | 82.00 | 37.00 | 69.90 | 23.25 | 140.00 | 28.00 | 65.99 | 19.57 | 140.00 |
| | V3 | 1.00 | 62.62 | 20.71 | 102.00 | 42.50 | 77.56 | 21.04 | 128.00 | 1.00 | 70.24 | 22.00 | 128.00 |
| Lipids (g per 100 mL) | V1 | 2.50 | 3.98 | 0.84 | 6.00 | 2.70 | 4.36 | 0.97 | 6.20 | 2.50 | 4.17 | 0.92 | 6.20 |
| | V2 | 0.70 | 3.61 | 1.43 | 5.70 | 1.00 | 4.46 | 2.41 | 11.90 | 0.70 | 4.03 | 2.00 | 11.90 |
| | V3 | 0.40 | 3.88 | 1.78 | 7.90 | 1.70 | 5.39 | 2.14 | 10.50 | 0.40 | 4.65 | 2.10 | 10.50 |
| Linoleic acid (mg per 100 mL) | V1 | 39.67 | 461.57 | 191.76 | 848.29 | 27.01 | 670.57 | 256.17 | 1294.82 | 27.01 | 566.07 | 247.58 | 1294.82 |
| | V2 | 65.55 | 508.30 | 274.10 | 1344.37 | 179.15 | 670.45 | 336.10 | 1343.89 | 65.55 | 589.37 | 314.38 | 1344.37 |
| | V3 | 16.79 | 526.20 | 418.80 | 1864.30 | 236.95 | 730.90 | 422.92 | 1844.22 | 16.79 | 628.55 | 429.02 | 1864.30 |
| Total PUFA (g per 100 mL) | V1 | 0.12 | 0.57 | 0.22 | 0.96 | 0.22 | 0.80 | 0.27 | 1.46 | 0.12 | 0.68 | 0.27 | 1.46 |
| | V2 | 0.08 | 0.60 | 0.32 | 1.57 | 0.22 | 0.78 | 0.38 | 1.57 | 0.08 | 0.69 | 0.36 | 1.57 |
| | V3 | 0.02 | 0.61 | 0.49 | 2.21 | 0.29 | 0.84 | 0.48 | 2.18 | 0.02 | 0.73 | 0.49 | 2.21 |
| Phosphatidyl-choline (mg per 100 mL) | V1 | 3.31 | 5.81 | 1.26 | 8.30 | 3.29 | 6.12 | 1.42 | 9.23 | 3.29 | 5.97 | 1.34 | 9.23 |
| | V2 | 1.62 | 4.43 | 1.89 | 8.70 | 1.96 | 5.25 | 2.17 | 11.92 | 1.62 | 4.84 | 2.06 | 11.92 |
| | V3 | 1.97 | 4.52 | 1.98 | 8.44 | 3.24 | 5.32 | 1.72 | 10.16 | 1.97 | 4.94 | 1.88 | 10.16 |
| Phosphatidyl-ethanolamine (mg per 100 mL) | V1 | 3.15 | 6.47 | 1.62 | 9.04 | 3.19 | 7.05 | 2.06 | 11.12 | 3.15 | 6.76 | 1.86 | 11.12 |
| | V2 | 2.35 | 5.70 | 2.30 | 11.15 | 2.37 | 7.02 | 3.68 | 18.25 | 2.35 | 6.36 | 3.11 | 18.25 |
| | V3 | 2.67 | 7.24 | 3.23 | 14.71 | 5.26 | 8.85 | 2.81 | 15.38 | 2.67 | 8.08 | 3.10 | 15.38 |
| Phosphatidyl-nositol (mg per 100 mL) | V1 | 0.54 | 0.99 | 0.27 | 1.57 | 0.59 | 1.15 | 0.41 | 2.25 | 0.54 | 1.07 | 0.35 | 2.25 |
| | V2 | 0.47 | 1.00 | 0.38 | 2.01 | 0.41 | 1.27 | 0.66 | 2.70 | 0.41 | 1.13 | 0.55 | 2.70 |
| | V3 | 0.64 | 1.51 | 0.66 | 3.88 | 1.01 | 1.81 | 0.63 | 3.14 | 0.64 | 1.67 | 0.66 | 3.88 |
| Total phospholipid content (mg per 100 mL) | V1 | 14.16 | 22.01 | 1.41 | 28.59 | 12.54 | 24.03 | 5.42 | 33.77 | 12.54 | 23.02 | 4.88 | 33.77 |
| | V2 | 7.64 | 18.73 | 6.67 | 31.93 | 8.61 | 22.83 | 9.76 | 51.67 | 7.64 | 20.78 | 8.53 | 51.67 |
| | V3 | 9.72 | 22.02 | 8.63 | 41.88 | 15.66 | 26.29 | 7.44 | 42.95 | 9.72 | 24.24 | 8.23 | 42.95 |

Example 2

An example of a starter infant formula for infant boys up to the age of three months is given below. The protein source is a conventional mix of whey protein and casein.

| Nutrient | per 100 kcal | per litre |
|---|---|---|
| Energy (kcal) | 100 | 678 |
| Protein (g) | 1.68 | 11.3 |
| Fat (g) | 6.38 | 43.64 |
| Linoleic acid (g) | 0.98 | 6.7 |
| α-Linolenic acid (mg) | 70 | 471 |
| Lactose (g) | 9.41 | 62.6 |
| Minerals (g) | 0.37 | 2.5 |
| Na (mg) | 23 | 150 |
| K (mg) | 89 | 590 |
| CI (mg) | 64 | 430 |
| Ca (mg) | 62 | 410 |
| P (mg) | 31 | 210 |
| Mg (ring) | 7 | 50 |
| Mn (µg) | 8 | 50 |
| Se (µg) | 2 | 13 |
| Vitamin A (µg RE) | 105 | 700 |
| Vitamin D (µg) | 1.5 | 10 |
| Vitamin E (mg TE) | 0.8 | 5.4 |
| Vitamin K1 (µg) | 8 | 54 |
| Vitamin C (mg) | 10 | 67 |
| Vitamin B1 (mg) | 0.07 | 0.47 |
| Vitamin B2 (mg) | 0.15 | 1 |
| Niacin (mg) | 1 | 6.7 |
| Vitamin B6 (mg) | 0.075 | 0.5 |
| Folic acid (µg) | 9 | 60 |
| Pantothenic acid (mg) | 0.45 | 3 |
| Vitamin B12 (µg) | 0.3 | 2 |
| Biotin (µg) | 2.2 | 15 |
| Choline (mg) | 10 | 67 |
| Fe (mg) | 1.2 | 8 |
| I (µg) | 15 | 100 |
| Cu (mf) | 0.06 | 0.4 |
| Zn (mg) | 0.75 | 5 |
| Phosphatidylcholine (mg) | 9.12 | 61.2 |
| Phosphatidylethanolamine (mg) | 10.51 | 70.5 |
| Phosphatidylinositol (mg) | 1.75 | 11.5 |

Example 3

An example of an infant formula for infant boys older than three months is given below. The protein source is a conventional mix of whey protein and casein.

| Nutrient | per 100 kcal | per litre |
|---|---|---|
| Energy (kcal) | 100 | 775.64 |
| Protein (g) | 1.18 | 8.48 |
| Fat (g) | 6.38 | 53.88 |
| Linoleic acid (g) | 0.92 | 7.31 |
| α-Linolenic acid (mg) | 60 | 452.9 |
| Lactose (g) | 8.64 | 63.56 |
| Minerals (g) | 0.37 | 2.5 |
| Na (mg) | 23 | 150 |
| K (mg) | 89 | 590 |
| CI (mg) | 64 | 430 |
| Ca (mg) | 62 | 410 |
| P (mg) | 31 | 210 |
| Mg (ring) | 7 | 50 |
| Mn (µg) | 8 | 50 |
| Se (µg) | 2 | 13 |
| Vitamin A (µg RE) | 105 | 700 |
| Vitamin D (µg) | 1.5 | 10 |
| Vitamin E (mg TE) | 0.8 | 5.4 |
| Vitamin K1 (µg) | 8 | 54 |
| Vitamin C (mg) | 10 | 67 |
| Vitamin B1 (mg) | 0.07 | 0.47 |
| Vitamin B2 (mg) | 0.15 | 1 |
| Niacin (mg) | 1 | 6.7 |
| Vitamin B6 (mg) | 0.075 | 0.5 |
| Folic acid (µg) | 9 | 60 |

-continued

| Nutrient | per 100 kcal | per litre |
|---|---|---|
| Pantothenic acid (mg) | 0.45 | 3 |
| Vitamin B12 (μg) | 0.3 | 2 |
| Biotin (μg) | 2.2 | 15 |
| Choline (mg) | 10 | 67 |
| Fe (mg) | 1.2 | 8 |
| I (μg) | 15 | 100 |
| Cu (mf) | 0.06 | 0.4 |
| Zn (mg) | 0.75 | 5 |
| Phosphatidylcholine (mg) | 7.07 | 53.2 |
| Phosphatidylethanolamine (mg) | 11.83 | 88.5 |
| Phosphatidylinositol (mg) | 2.4 | 18.1 |

Example 4

An example of a starter infant formula for infant girls up to the age of three months is given below. The protein source is a conventional mix of whey protein and casein.

| Nutrient | per 100 kcal | per litre |
|---|---|---|
| Energy (kcal) | 100 | 640.4 |
| Protein (g) | 1.66 | 10.72 |
| Fat (g) | 6.18 | 39.8 |
| Linoleic acid (g) | 0.72 | 4.62 |
| α-Linolenic acid (mg) | 50 | 329.6 |
| Lactose (g) | 9.98 | 62.88 |
| Minerals (g) | 0.37 | 2.5 |
| Na (mg) | 23 | 150 |
| K (mg) | 89 | 590 |
| CI (mg) | 64 | 430 |
| Ca (mg) | 62 | 410 |
| P (mg) | 31 | 210 |
| Mg (ring) | 7 | 50 |
| Mn (μg) | 8 | 50 |
| Se (μg) | 2 | 13 |
| Vitamin A (μg RE) | 105 | 700 |
| Vitamin D (μg) | 1.5 | 10 |
| Vitamin E (mg TE) | 0.8 | 5.4 |
| Vitamin K1 (μg) | 8 | 54 |
| Vitamin C (mg) | 10 | 67 |
| Vitamin B1 (mg) | 0.07 | 0.47 |
| Vitamin B2 (mg) | 0.15 | 1 |
| Niacin (mg) | 1 | 6.7 |
| Vitamin B6 (mg) | 0.075 | 0.5 |
| Folic acid (μg) | 9 | 60 |
| Pantothenic acid (mg) | 0.45 | 3 |
| Vitamin B12 (μg) | 0.3 | 2 |
| Biotin (μg) | 2.2 | 15 |
| Choline (mg) | 10 | 67 |
| Fe (mg) | 1.2 | 8 |
| I (μg) | 15 | 100 |
| Cu (mf) | 0.06 | 0.4 |
| Zn (mg) | 0.75 | 5 |
| Phosphatidylcholine (mg) | 9.16 | 58.1 |
| Phosphatidylethanolamine (mg) | 10.16 | 64.7 |
| Phosphatidylinositol (mg) | 1.58 | 9.9 |

Example 5

An example of a hypoallergenic infant formula for infant girls older than three months is given below. The protein source is a convention mix of whey protein and casein.

| Nutrient | per 100 kcal | per litre |
|---|---|---|
| Energy (kcal) | 100 | 626.17 |
| Partially Hydrolysed Protein (g) | 1.4 | 8.12 |
| Fat (g) | 5.87 | 38.75 |

-continued

| Nutrient | per 100 kcal | per litre |
|---|---|---|
| Linoleic acid (g) | 0.82 | 5.26 |
| α-Linolenic acid (mg) | 50 | 308 |
| Lactose (g) | 10.35 | 65.38 |
| Minerals (g) | 0.37 | 2.5 |
| Na (mg) | 23 | 150 |
| K (mg) | 89 | 590 |
| CI (mg) | 64 | 430 |
| Ca (mg) | 62 | 410 |
| P (mg) | 31 | 210 |
| Mg (ring) | 7 | 50 |
| Mn (μg) | 8 | 50 |
| Se (μg) | 2 | 13 |
| Vitamin A (μg RE) | 105 | 700 |
| Vitamin D (μg) | 1.5 | 10 |
| Vitamin E (mg TE) | 0.8 | 5.4 |
| Vitamin K1 (μg) | 8 | 54 |
| Vitamin C (mg) | 10 | 67 |
| Vitamin B1 (mg) | 0.07 | 0.47 |
| Vitamin B2 (mg) | 0.15 | 1 |
| Niacin (mg) | 1 | 6.7 |
| Vitamin B6 (mg) | 0.075 | 0.5 |
| Folic acid (μg) | 9 | 60 |
| Pantothenic acid (mg) | 0.45 | 3 |
| Vitamin B12 (μg) | 0.3 | 2 |
| Biotin (μg) | 2.2 | 15 |
| Choline (mg) | 10 | 67 |
| Fe (mg) | 1.2 | 8 |
| I (μg) | 15 | 100 |
| Cu (mf) | 0.06 | 0.4 |
| Zn (mg) | 0.75 | 5 |
| Phosphatidylcholine (mg) | 6.68 | 45.2 |
| Phosphatidylethanolamine (mg) | 10.68 | 72.4 |
| Phosphatidylinositol (mg) | 2.28 | 15.1 |

The invention is claimed as follows:

1. A method for promoting balanced growth in infants or young children and reducing a risk of obesity in the infants or young children now and later in life, the method comprising:

providing a set of distinct synthetic nutritional compositions comprising a first synthetic composition and a second synthetic composition; and administering to a male infant or young boy the first synthetic composition, wherein the first synthetic composition is a foodstuff comprising
60-85 kcal/100 ml energy;
3.9-6 g/100 ml lipid;
600-810 mg/100 ml linoleic acid;
710-930 mg/100 ml polyunsaturated acids; and
21-30 mg/100ml phospholipids, the phospholipids comprising phosphatidylcholine that is 4.7-6.8 mg/100 ml of the first synthetic composition, phosphatidylethanolamine that is 6.3-10 mg/100 ml of the first synthetic composition, and phosphatidylinositol that is 1-2 mg/100 ml of the first synthetic composition;

administering to a female infant or young girl the second synthetic composition, wherein the second synthetic composition comprises one or more of linoleic acid, phospholipids, phosphatidylcholine, phosphatidylethanolamine, or phosphatidylinositol, and the second synthetic composition comprises at least one characteristic selected from the group consisting of:

the second synthetic composition comprises 410-580 mg/100 ml linoleic acid, the second synthetic composition comprises 19-25 mg/100 ml of phospholipids, the second synthetic composition comprises 5.2-6.4 mg/100 ml of phosphatidylcholine, the second synthetic composition comprises 5.8-8 mg/100 ml of phosphatidylethanolamine, and the second synthetic composition comprises 0.9-1.7 mg/100 ml of phosphatidylinositol;

wherein the first synthetic composition has a quantity of at least one component that differs by at least 10% relative to the second synthetic composition, the at least one component selected from the group consisting of the linoleic acid, the phospholipids, the phosphatidylcholine, the phosphatidylethanolamine, and the phosphatidylinositol.

2. The method of claim 1, wherein the energy is 60-75 kcal/100 ml of the first synthetic composition, the lipid is 3.9-4.9 g/100 ml of the first synthetic composition, and the linoleic acid is 600-740 mg/100 ml of the first synthetic composition, the first synthetic composition is administered to a male infant less than three months old, and the first synthetic composition further comprises at least one characteristic selected from the group consisting of:

the polyunsaturated acids are present in the first synthetic composition in an amount of 710-880 mg/100 ml, the phosphatidylcholine is present in the first synthetic composition in an amount of 5.4-6.8 mg/100 ml, the phosphatidylethanolamine is present in the first synthetic composition in an amount of 6.7-7.5 mg/100 ml, the phosphatidylinositol is present in the first synthetic composition in an amount of 1-1.3 mg/100 ml, and the phospholipids are present in the first synthetic composition in an amount of 21-26 mg/100 ml.

3. The method of claim 1, wherein the energy is 70-85 kcal/100 ml of the first synthetic composition, the lipid is 5.0-6.0 g /100 ml of the first synthetic composition, and the linoleic acid is 660-810 mg/100 ml of the composition, the first synthetic composition is administered to a male infant or young boy more than three months old, and the first synthetic composition further comprises at least one characteristic selected from the group consisting of:

the polyunsaturated acids are present in the first synthetic composition in an amount of 755-930 mg/100 ml, the phosphatidylcholine is present in the first synthetic composition in an amount of 4.77-5.8 mg/100 ml, the phosphatidylethanolamine is present in the first synthetic composition in an amount of 8-9.5 mg/100 ml, the phosphatidylinositol is present in the first synthetic composition in an amount of 1.6-1.98 mg/100 ml, and the phospholipids are present in the first synthetic composition in an amount of 24-30 mg/100 ml.

4. The method of claim 1, wherein the first synthetic composition comprises whey protein, casein, lactose, vitamins and minerals.

5. The method of claim 1, wherein the male infant is a preterm infant and/or a caesarean-born infant.

6. The method of claim 1, wherein the male infant or young boy was born from a mother having obesity or overweight.

7. The method of claim 1, wherein the first synthetic composition is administered to a male infant less than three months old, and the lipid is 4.3-4.5 g/100 ml of the first synthetic composition.

8. The method of claim 1, wherein the first synthetic composition is administered to a male infant less than three months old, and the linoleic acid is 650-690 mg/100 ml of the first synthetic composition.

9. The method of claim 1, wherein the first synthetic composition is administered to a male infant less than three months old, and the polyunsaturated acids are present in the first synthetic composition in an amount of 780-820 mg/100 ml.

10. The method of claim 1, wherein the first synthetic composition is administered to a male infant less than three months old, and the phosphatidylcholine is present in the first synthetic composition in an amount of 5.9-6.3 mg/100 ml.

11. The method of claim 1, wherein the first synthetic composition is administered to a male infant less than three months old, and the phosphatidylinositol is present in the first synthetic composition in an amount of 1.2 mg/100 ml.

12. The method of claim 1, wherein the first synthetic composition is administered to a male infant less than three months old, and the phospholipids are present in the first synthetic composition in an amount of 23-25 mg/100 ml.

13. The method of claim 1, wherein the first synthetic composition is administered to a male infant less than three months old, and the energy is 66-68 kcal/100 ml of the first synthetic composition.

14. The method of claim 1, wherein the second synthetic composition comprises 57-70 kcal/100 ml energy and 3.5-4.5 g/100 ml lipid.

15. The method of claim 14, wherein the second synthetic composition further comprises 510-680 mg/100 ml polyunsaturated acids.

* * * * *